3,206,498
HYDRODIMERIZATION OF ACRYLONITRILES
Ralph C. Schreyer, Wilmington, Del., assignor to E. I. du Pont de Nemours and Company, Wilmington, Del., a corporation of Delaware
No Drawing. Filed May 21, 1963, Ser. No. 282,172
7 Claims. (Cl. 260—465.8)

This invention relates to the preparation of 2-methylglutaronitrile from acrylonitrile.

In the past dinitriles have been prepared by the uncataylzed thermal dimerization of unsaturated mononitriles. The product reported to have been obtained from acrylonitrile by such process is 1,2-dicyanocyclobutane (Coyner, E. C. and Hillman, W. S., J. Am. Chem. Soc. 71, 324–326 (1949)).

According to the present invention, acrylonitrile is hydrodimerized, i.e., dimerized and reduced, to form 2-methylglutaronitrile by contacting acrylonitrile with cobalt carbonyl hydride and water in the presence of carbon monoxide at a pressure of at least about 1000 p.s.i. ga. and at a temperature within the range of about 130° C. to about 300° C.

The cobalt carbonyl hydride, i.e. $HCo(CO)_4$, can be prepared outside of the reactor in which the present process is to be carried out, or it can be prepared in situ either prior to the attainment of the conditions employed in the present process, or while the reaction conditions prevail in the reactor. Whether prepared outside of the reactor or in situ, care must be taken to stabilize the hydride as formed, and for this reason it should be kept in contact with carbon monoxide under pressure. To stabilize the hydride at the reaction temperature, the carbon monoxide should be at a pressure of at least about 1000 p.s.i. ga.

The method used to prepare the hydride has no critical effect on the present process. Any of the known methods can be used. For example, the hydride can be formed from cobalt carbonyl and hydrogen or water. Or, one can react cobalt or a cobalt salt such as cobalt sulfide, acetate, or halide with carbon monoxide and hydrogen or water. If the free metal is employed, it should be in a finely divided active state (e.g., prepared by reduction of colbalt oxide). A catalyst for carbonyl formation, such as iodine, sulfur, or a compound thereof, is sometimes used. When a cobalt salt is employed, a free metal such as copper is useful as an acceptor for the nonmetal.

For reasons of convenience, it is preferred that in the present process the cobalt carbonyl hydride be prepared in situ, either prior to the attainment of the conditions employed in the present process, or while the reaction conditions prevail in the reactor. Thus, one may charge cobalt carbonyl, $Co_2(CO)_8$, to the reactor instead of cobalt carbonyl hydride, and the latter can then be formed in situ (1) by reaction of the carbonyl with hydrogen or water prior to the attainment of the reaction conditions to be employed for the hydrodimerization, or (2) by reaction of the carbonyl with water while the hydrodimerization reaction conditions prevail. In another manner, one can charge cobalt or a cobalt salt to the reactor and contact it with carbon monoxide at a pressure of at least about 2000 p.s.i. ga. and hydrogen or water to form the hydride in situ prior to the attainment of the hydrodimerization conditions; or the hydride can be formed under the hydrodimerization conditions from cobalt or a cobalt salt by reaction with the carbon monoxide and water present. For the formation of the hydride, temperatures of 100–200° C. and pressures of 1000–3000 p.s.i. ga. generally are employed, the particular conditions used depending on the starting materials. The reaction conditions employed in the present process thus are adequate for in situ formation of the hydride.

The pressure of the carbon monoxide used in the present process depends on various factors, particularly on whether or not the gas is required to form the hydride in situ. If cobalt carbonyl or cobalt carbonyl hydride is charged to the reactor, carbon monoxide under a pressure of at least about 1000 p.s.i. ga. is sufficient to stabilize the hydride at reaction temperatures. On the other hand, if the hydride is to be prepared in situ by reaction involving carbon monoxide, the reactor generally will be pressurized with carbon monoxide at a pressure of at least about 2000 p.s.i. ga., and preferably at least about 3000 p.s.i. ga., to assure reaction of the carbon monoxide with either cobalt or a salt thereof. Pressures of about 5000–6000 p.s.i. ga. show particular benefit with respect to reaction rate. Higher pressures, e.g., pressures up to about 15,000 p.s.i. ga., are operable, but appear to offer no advantage.

The process of this invention is effected at a temperature within the range of about 130° C. to about 300° C. Preferably, a temperature in the range of about 160° C. to about 200° C. is used. Temperatures below about 130° C. are insufficient to bring about reaction of the acrylonitrile at a practical rate. Temperatures above about 300° C. are undesirable since side-reactions tend to occur.

While the mechanism of the reaction which takes place in the present process is not known with certainty, it appears that cobalt carbonyl hydride and water both are required to achieve the hydrodimerization. Since cobalt carbonyl reacts with water to form coaalt carbonyl hydride, cobalt carbonyl may be substituted for the hydride as a starting material provided the amount of water present is in excess of the amount required to form the hydride. Preferably, at least about one-half mole of water should be present per mole of acrylonitrile. Larger quantities of water can be used but the amount should not be so large as to destroy the homogeneity of the reaction mixture. In general the amount of water should not exceed an amount which provides a water/acrylonitrile molar ratio higher than about 30/1. Cobalt carbonyl hydride should be empolyed only in catalytic quantities, e.g., from about 0.01 mole of hydride to about 0.25–0.50 mole of hydride per mole of acrylonitrile, since larger amounts may cause the hydrolysis of the nitrile groups in the product.

It is not necessary to use a solvent in the present process. However, to provide a homogenous reaction system and therefore better contact of the nitrile with the hydride, it is preferable that a water-miscible inert solvent for the nitrile and hydride be used. Generally, the use of a solvent results in improved yields. Typical of the solvents which may be used are, for example, dioxan, acetone, and tetrahydrofuran.

Agitation of the reactants is desirable for better contact thereof.

While the time period during which the nitrile is in contact with the hydride may vary depending on the temperature used, generally reaction times of 0.25 to 2 hours are required.

2-methylglutaronitrile is a compound which offers considerable interest as an intermediate for polymers. For example, it can be hydrogenated to a diamine, which can then be reacted with polycarboxylic acids, e.g., adipic acid, sebacic acid, or terephthalic acid, to form polyamides. The nitrile also is an intermediate to nicotinic acid and nicotinamide by a route involving hydrogenation to 3-methylpiperidine, dehydrogenation of the piperidine to 3-methylpyridine, and oxidation of the latter to the pyridinecarboxylic acid.

The following examples serve to illustrate specific embodiments of the method of carrying out the process of the present invention. However, they will be understood

Example 1

Thirty milliliters of acrylonitrile, 125 milliliters of acetone, 18 milliliters of water, 5 grams of cobalt (the reduced oxide), and 0.5 gram of iodine were charged to an agitated, stainless steel autoclave. Carbon monoxide was introduced under an initial pressure of 6000 p.s.i. ga., and the mixture was heated at 175° C. for 2 hours. An identical charge was treated in the same manner, and, after filtering off of the solids, the reaction mixtures from the two runs were combined. The resulting mixture was distilled at 3–4 mm. to give water, acetone, unreacted acrylonitrile, and a liquid boiling at 85–100° C. Redistillation gave 4.5 grams of a liquid boiling at 128–29° C. at 10 mm.

Calcd. for $C_6H_8N_2$: C, 66.67; H, 7.41; N, 25.92. Found: C, 66.60, 66.71; H, 7.42, 7.49; N, 25.67, 25.79.

The liquid was identified as 2-methylglutaronitrile by hydrolysis to 2-methylglutaric acid. One gram of the liquid was refluxed for one hour with 10 milliliters of water and 10 milliliters of concentrated hydrochloric acid. The aqueous mixture was extracted four times with 100 milliliters of ether, and dried over anhydrous sodium sulfate. Removal of the ether gave 1 gram of a solid. The latter was recrystallized from ether-petroleum ether to give 0.85 gram of a solid, the infrared spectrum of which was identical with that of a known sample of 2-methylglutaric acid. The compound melted at 76–77° C. (reported in literature for 2-methylglutaric acid: 77–78° C.).

Example 2

An autoclave containing 30 milliliters of acrylonitrile, 18 milliliters of water, 5 grams of cobalt (reduced oxide), and 0.5 gram of iodine was pressurized to 6000 p.s.i. ga. with carbon monoxide, and the mixture was heated at 175° C. for 2 hours. The product was decanted, and the liquid distilled at 5–6 mm. to give 1.9 grams of a fraction boiling at 90–110° C. and 0.7 gram of a fraction boiling at 110–115° C. Gas chromatography and infrared spectroscopy indicated that the major peak from these fractions was the same as that of the liquid product obtained in the experiment described in Example 1.

Example 3

Fifty milliliters of benzene and 2 grams of cobalt were placed in a stainless steel reactor provided with agitating means. The reactor was pressurized at 8000 p.s.i. ga. and 175° C. with a 1:1 mixture (by volume) of carbon monoxide and hydrogen. After 1 hour, the reactor was cooled to room temperature, and the gases vented. The reactor containing cobalt carbonyl hydride was flushed out with carbon monoxide several times. Then 125 milliliters of acetone, 18 milliliters of water, and 30 milliliters of acrylonitrile were added. Carbon monoxide was introduced at an initial pressure of 6000 p.s.i. ga., and the mixture was heated at 175° C. for 2 hours. The product was distilled to remove water and acetone. 5.8 grams of a material boiling at 100–120° C. at 4–5 mm. was obtained. Vapor-phase chromatography and infrared analysis indicated that 50% of this fraction was 2-methylglutaronitrile.

The invention has been described in detail in the foregoing. However, it will be apparent to those skilled in the art that many variations are possible without departure from the scope of the invention. I intend, therefore, to be limited only by the following claims.

I claim:

1. A process for preparing 2-methylglutaronitrile which comprises contacting acrylonitrile with a catalytic amount of cobalt carbonyl hydride and about from 0.5 to 30 moles of water per mole of acrylonitrile in the presence of carbon monoxide at a pressure of about from 1000 to 15,000 p.s.i. ga. and at a temperature within the range of about 130° C. to about 300° C.

2. A process according to claim 1, wherein said cobalt carbonyl hydride is prepared in situ from cobalt carbonyl by reaction with said water.

3. A process according to claim 1, wherein said cobalt carbonyl hydride is prepared in situ from said water, carbon monoxide, and a cobalt material selected from the group consisting of cobalt, cobalt sulfide, cobalt acetate and cobalt halide, said carbon monoxide being at a pressure of at least about 2000 p.s.i. ga.

4. A process according to claim 1, wherein said acrylonitrile and said cobalt carbonyl hydride are in solution in an inert water-miscible solvent.

5. A process according to claim 3, wherein iodine is present to catalyze the reaction between carbon monoxide and said cobalt material.

6. A process for preparing 2-methylglutaronitrile by the hydrodimerization of acrylonitrile which comprises contacting, at a temperature of about from 160 to 200° C., (a) acrylonitrile, (b) about from 0.01 to 0.50 mole of cobalt carbonyl hydride per mole of acrylonitrile, (c) about from 0.5 to 30 moles of water per mole of acrylonitrile and (d) carbon monoxide at a pressure of about from 1000 to 15,000 p.s.i. ga., and then recovering the 2-methylglutaronitrile thus obtained from the reaction mixture.

7. A process according to claim 6, wherein the cobalt carbonyl hydride is prepared in situ.

No references cited.

CHARLES B. PARKER, *Primary Examiner.*
JOSEPH P. BRUST, *Examiner.*